Patented Apr. 22, 1941

2,239,005

UNITED STATES PATENT OFFICE 2,239,005

HEXAKISAZO DYESTUFFS AND THEIR MANUFACTURE

Adolf Krebser, Riehen, near Basel, Switzerland, assignor to the firm J. R. Geigy A. G., Basel, Switzerland No Drawing. Application October 2, 1939, Serial No. 297,590. In Switzerland October 5, 1938

5 Claims. (Cl. 260—144)

I have found that hexakisazo dyestuffs of the general formula:

(C—N=N—B—N=N—A—N=N—D—N=
    N—A—N=N—B—N=N—C) (SO$_3$H)$_x$ wherein D represents a radical with two benzene nuclei, which are connected either directly or by the atoms or atom groups —O—, —S—, —NH—, —CH$_2$—, —SO$_2$—, —CH$_2$—CH$_2$—, —CH=CH—, —HN—CO— etc., A represents a resorcinol radical, B a naphthalene radical containing the azo groups in 1,4 position, C a diphenylamine radical and $x$ signifies a whole number, at least 4, whereby the distribution of the sulphonic acid groups in the radicals B, C and D may vary, are particularly convenient for the dyeing of leather. The new dyestuffs defined as above yield reddish to yellowish brown shades of great dyeing power.

The manufacture of these new dyestuffs may be effected for example by diazotizing and coupling in alkaline solution two molecules of the monoazo dyestuff C—N=N—B—NH$_2$ with the disazo dyestuff

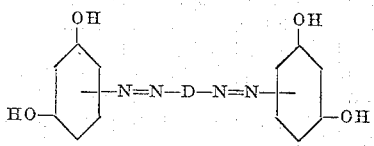

or by coupling one molecule of a tetrazotized diamine of the formula H$_2$N—D—NH$_2$ with two molecules of a disazo dyestuff of the formula C—N=N—B—N=N—A, in which formulae the letters A, B, C and D have the above given meanings. In all cases, the end product must contain at least 4 sulphonic acid groups.

The following examples illustrate the invention, the parts being by weight.

Example 1

54.3 parts of the monoazo dyestuff from diazotized 4'-nitro-4-aminodiphenylamine-2'-sulphonic acid and 1-naphthylamine-6-sulphonic acid or the mixture with the 1,7-isomer are dissolved in water with 4 parts of caustic soda lye of 100 per cent strength, mixed with 7 parts of sodium nitrite and allowed to run at 0° C. into 35 parts of hydrochloric acid of 30 per cent strength. The diazotization is completed after a few hours.

The thus obtained diazo compound is added to an aqueous solution of 25.3 parts of the disazo dyestuff prepared according to known methods from 1 molecule of tetrazotized benzidine-2-monosulphonic acid and 2 molecules of resorcinol in 40 parts of soda at 0° C. After the coupling is complete, the whole is heated to 50° C. and the dyestuff isolated by means of common salt and hydrochloric acid. The dyestuff filtered and dried constitutes a dark powder which dissolves in water to a deep red-brown, in concentrated sulphuric acid to a blue solution and dyes leather deep reddish-brown shades. The same dyestuff can also be obtained, but somewhat more difficultly, if 2 molecules of the monoazodyestuff from diazotized 4'-nitro-4- aminodiphenyl - amine - 2'-sulphonic acid and 1-naphthylamine-6-sulphonic acid or the mixture with the 1,7-isomer are diazotized and coupled with 2 molecules of resorcinol. The thus obtained tetrakisazodyestuff is combined in strongly soda-alkaline solution with 1 molecule of tetrazotized benzidine -2-monosulphonic acid.

If in this example the used benzidine-2-monosulphonic acid is replaced by the N,3'-aminobenzoyle-1:4-diamino-benzene-3-sulphonic acid or the N,4'-aminobenzoyle-1:4- diaminobenzene - 3-sulphonic acid, a similar dyestuff will be obtained.

Example 2

54.3 parts of the monoazo dyestuff from diazotized 4'-nitro-4-aminodiphenylamine-2'-sulphonic acid and the mixture of 1-naphthylamine-6- and -7-sulphonic acid are diazotized as described in Example 1 and the diazo compound is added to a solution of 30.6 parts of the disazo dyestuff from 1 molecule of tetrazotized 4:4'-diaminostilbene-2:2'-disulphonic acid and 2 molecules of resorcinol in water and 40 parts of soda at 0° C. The coupling is completed in a few hours. The new dyestuff is precipitated with common salt and some hydrochloric acid, filtered and dried. The new dyestuff, a dark powder, dissolves in water with deep reddish-brown, in concentrated sulphuric acid with blue-violet coloration. It dyes leather deep reddish-brown shades.

If instead of the 4:4'-diaminostilbene-2:2'-disulphonic acid there are used the 4:4'-diaminodiphenyl-sulphide-2:2'-disulphonic acid, the 4:4'-diaminodibenzyl-2:2'-disulphonic acid, the 4:4'-diamino - 3:3' - dimethyl - diphenylmethandisulphonic acid, the 3:3'-diamino-4:4'-dimethyldiphenylmethandisulphonic acid, the 4:4'-diaminodiphenylether-3:3'-disulphonic acid or the 4:4'-diamino-diphenylsulphone-disulphonic acid, similar dyestuffs are obtained.

Example 3

49.8 parts of the monazo dyestuff from diazotized 4-aminodiphenylamine-2-sulphonic acid and 1-naphthylamine-6- and -7-sulphonic acid are diazotized in an analogous manner to that of Example 1. The diazo compound is coupled with 29.3 parts of the disazodyestuff from 1 molecule of tetrazotized 4:4'-diaminodiphenyl-2:2'-disulphonic acid and 2 molecules of resorcinol, which has been dissolved with 40 parts of soda and the necessary quantity of water and adjusted to 0° C. The coupling being achieved, the solution is heated to 50° C., salted out, filtered and dried. The new dyestuff is a dark powder, which dissolves in water with yellowish-brown coloration, in concentrated sulphuric acid with dirty black-brown coloration and dyes leather deep brown shades.

Example 4

54.3 parts of the monoazo dyestuff from diazotized 4'-nitro-4-aminodiphenylamine-2'-sulphonic acid and a mixture of 1-naphthylamine-6- and -7-sulphonic acid are diazotized, as described in Example 1, and then coupled at 0° C. with a solution of 29.3 parts of the disazo dyestuff from 1 molecule of tetrazotized 4:4'-diaminodiphenyl-2:2'-disulphonic acid and 2 molecules of resorcinol, dissolved in water and 40 parts of soda. After some hours it is heated to 45° C., salted out, filtered and dried. The new dyestuff, a dark powder, dissolves in water with brown coloration, in concentrated sulphuric acid with brown-olive coloration and dyes leather deep brown shades.

If instead of the 4:4'-diaminodiphenyl-2:2'-disulphonic acid there is used the 4:4-diamino-3:3'-dimethyldiphenyl-2:2'-disulphonic acid or the 4:4'-diaminodiphenylamine-2-monosulphonic acid respectively the -2:3'-disulphonic acid, similar dyestuffs are obtained. With the same result the 4'-nitro-4-amino-diphenylamine-2'-sulphonic acid can be replaced by the 2'-nitro-4-aminodiphenylamine-4'-sulphonic acid or the mixture of 1-naphthylamine-6- and -7-sulphonic acid can be replaced by α-naphthylamine.

Example 5

68.3 parts of the monoazo dyestuff from diazotized 2'-nitro-4-amino-diphenylamine-4'-phenylsulphone-3''-sulphonic acid (obtained from 4-chloro-3-nitro-diphenylsulphone-3'-sulphonic acid by condensation with 4-acetylaminoaniline and saponification) and the mixture of 1-naphthylamine-6- and -7-sulphonic acid are diazotized as described in Example 1 and then coupled at 0° C. with a solution of 29.3 parts of the disazo dyestuff from 1 molecule of tetrazotized 4:4'-diaminodiphenyl-2:2'disulphonic acid and 2 molecules of resorcinol, dissolved in water and 40 parts of soda. After a few hours the formation of the dyestuff is achieved, then it is heated to 45° C., salted out, filtered and dried. The new dyestuff, a dark powder, dissolves in water with yellow-brown coloration, in concentrated sulphuric acid with dirty violet-black coloration and dyes leather beautiful, deep yellow-brown shades.

What I claim is:

1. A process for the manufacture of hexakisazo dyestuffs, comprising diazotizing two molecules of a monoazo dyestuff of the formula C—N=N—B—NH$_2$ and coupling the thus obtained diazo compound in alkaline solution with one molecule of a disazodyestuff of the formula

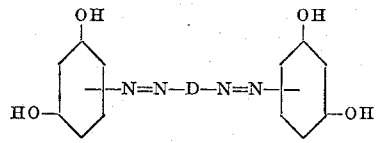

in which formulae D represents a radical with two interconnected benzene nuclei selected from the group consisting of two directly connected benzene nuclei and two benzene nuclei connected by O, S, NH, CH$_2$, SO$_2$, CH$_2$.CH$_2$, CH=CH and NHCO, B a naphthalene radical containing the azo groups in 1,4 position and C a diphenylamine radical, care being taken that at least 4 sulphonic acid groups are present in the molecule of the hexakisazo dyestuff.

2. The hexakisazo dyestuffs of the general formula (C—N=N—B—N=N—A—N=N—D—N=N—A—N=N—B—N=N—C) (SO$_2$H)$_x$ wherein D represents a radical with two interconnected benzene nuclei selected from the group consisting of two directly connected benzene nuclei and two benzene nuclei connected by O, S, NH, CH$_2$, SO$_2$, CH$_2$.CH$_2$, CH=CH and NHCO, A a resorcinol radical, B a naphthalene radical containing the azo groups in 1,4 position, C a diphenylamine radical and $x$ a whole number, at least 4, having sulphonic acid groups distributed in the radicals B, C and D, said dyestuffs being suitable for dyeing leather.

3. The hexakisazo dyestuff as product of condensation of the diazotized monoazo dyestuff from diazotized 4'-nitro-4-aminodiphenylamine-2'-sulphonic acid and 1-naphthylamine-6-sulphonic acid with the disazo dyestuff from 1 molecule of tetrazotized benzidine-2-monosulphonic acid and 2 molecules of resorcinol, said dyestuff being suitable for dyeing leather.

4. The hexakisazo dyestuff as product of condensation of the diazotized monoazo dyestuff from diazotized 4'-nitro-4-aminodiphenylamine-2'-sulphonic acid and the 1-naphthylamine-6- and -7-sulphonic acid mixture with the disazo dyestuff from 1 molecule tetrazotized 4:4'-diaminodiphenyl-2:2'-disulphonic acid and 2 molecules of resorcinol, said dyestuff being suitable for dyeing leather.

5. The hexakisazo dyestuff as product of condensation of the diazotized monoazo dyestuff from diazotized 2'-nitro-4-aminodiphenylamine-4'-phenylsulphone-3''-sulphonic acid and the 1-naphthylamine-6- and -7-sulphonic acid mixture with the disazo dyestuff from 1 molecule of tetrazotized 4:4'-diaminodiphenyl-2:2'-disulphonic acid and 2 molecules of resorcinol, said dyestuff being suitable for dyeing leather.

ADOLF KREBSER.